US012702923B2

(12) United States Patent
Mccoy et al.

(10) Patent No.: US 12,702,923 B2
(45) Date of Patent: Aug. 11, 2026

(54) SYSTEMS AND METHODS FOR EYE TRACKING, GAME OBJECT RENDERING CONTROL AND ACCESSIBILITY MODES

(71) Applicant: Sony Interactive Entertainment LLC, San Mateo, CA (US)

(72) Inventors: Charles Mccoy, San Diego, CA (US); True Xiong, San Diego, CA (US)

(73) Assignee: Sony Interactive Entertainment LLC

( * ) Notice: Subject to any disclaimer, the term of this patent is extended or adjusted under 35 U.S.C. 154(b) by 224 days.

(21) Appl. No.: 18/303,544

(22) Filed: Apr. 19, 2023

(65) Prior Publication Data

US 2024/0350912 A1 Oct. 24, 2024

(51) Int. Cl.
*A63F 13/525* (2014.01)
*A63F 13/213* (2014.01)
*A63F 13/428* (2014.01)

(52) U.S. Cl.
CPC .......... *A63F 13/525* (2014.09); *A63F 13/213* (2014.09); *A63F 13/428* (2014.09)

(58) Field of Classification Search
None
See application file for complete search history.

(56) References Cited

U.S. PATENT DOCUMENTS 9,451,210 B1 * 9/2016 Smus ...................... G06F 3/012
11,163,358 B2 * 11/2021 Marks ..................... G06F 3/013
11,348,300 B2 * 5/2022 Zimmermann .... G02B 27/0093
11,662,813 B2 * 5/2023 Marks ................... A63F 13/212 345/156
11,921,918 B2 * 3/2024 Hayashi ................ A63F 13/213
12,058,392 B2 * 8/2024 Lee ................ H04N 21/234345
2014/0204029 A1 7/2014 Lopez et al.
2016/0210503 A1 * 7/2016 Yin ........................ G06V 40/19
2017/0109936 A1 * 4/2017 Powderly ............ G06F 3/04883

(Continued)

FOREIGN PATENT DOCUMENTS

WO WO-2022232422 11/2022

OTHER PUBLICATIONS

International Search Report dated Aug. 1, 2024 in International Application No. PCT/US24/24903.

(Continued)

*Primary Examiner* — Seng H Lim
(74) *Attorney, Agent, or Firm* — Kilpatrick Townsend & Stockton LLP

(57) ABSTRACT

System, process, and device configurations are provided for game object rendering control with eye tracking data. A method can include detecting at least one focus position of a user using eye tracking data, identifying at least one object of the gaming content using the focus position, controlling rendering of the at least one object of the gaming content, and updating presentation of the gaming content to include the modified object. Modifications may include the addition of a highlight element, border, and change in presentation format for the at least one object, including blurring, fading or color saturation for a game object. Modifications can also include at least one of filtering and minimizing display elements of the gaming content. Processes are also provided for analyzing a facial expression of a user to detect at least one gesture and control modification to gaming content.

19 Claims, 5 Drawing Sheets

(56) References Cited

U.S. PATENT DOCUMENTS

2017/0269685 A1* 9/2017 Marks .................. A63F 13/212
2017/0315825 A1* 11/2017 Gordon ................ G06F 3/0346
2018/0089877 A1* 3/2018 Kim ..................... A63F 13/428
2018/0096518 A1* 4/2018 Mallinson ............... G06N 3/04
2019/0094981 A1* 3/2019 Bradski ............... G06V 40/168
2019/0099660 A1* 4/2019 Nelson ............... A63F 3/00157
2019/0235624 A1* 8/2019 Goldberg .......... G02B 27/0179
2019/0384385 A1 12/2019 Idris et al.
2020/0097067 A1* 3/2020 Chou ..................... A63F 13/42
2022/0100261 A1* 3/2022 Silverstein ........... A63F 13/428
2022/0270316 A1 8/2022 Zimmermann et al.
2023/0086766 A1* 3/2023 Olwal ............. H04N 21/41407 725/10
2023/0102371 A1 3/2023 Schonberg et al.
2023/0152885 A1* 5/2023 Hayashi ............. A63F 13/5258 463/31
2024/0115942 A1* 4/2024 Karimi ................. A63F 13/533
2025/0061664 A1* 2/2025 Haase .................. G06T 19/006

OTHER PUBLICATIONS

Written Opinion dated Aug. 1, 2024 in International Application No. PCT/US24/24903.

* cited by examiner

SYSTEMS AND METHODS FOR EYE TRACKING, GAME OBJECT RENDERING CONTROL AND ACCESSIBILITY MODES

FIELD

The present disclosure is directed to systems and methods for eye tracking and game object rendering control for game objects, including electronic game control, game content rendering, gaming device operations, gaming device processes and gaming device accessibility.

BACKGROUND

Computer and console games titles have been developed in many styles for different gaming systems and platforms. As device processing increases and game play environments become more immersive, there is a desire for presentation of content to account for user needs and for accessibility features. There also exists a desire to leverage entertainment functionality to modify game features such that content may be more accessible for all users. While rendering styles of gaming content may be suitable for some users, other users may find content challenging. As such, there is also a desire for configurations that allow for one or more accessibility modes.

BRIEF SUMMARY OF THE EMBODIMENTS

Disclosed and described herein are systems, methods and device configurations for game object rendering control with eye tracking data. In one embodiment, a method includes detecting, by a device, at least one focus position of a user using eye tracking data for the user, wherein the focus position is detected relative to a display location presenting gaming content. The method also includes identifying, by the device, at least one object of the gaming content using the focus position. The method also includes controlling, by the device, rendering of the at least one object of the gaming content, wherein at least one display characteristic of the at least one object is modified. The method also includes updating, by the device, presentation of the gaming content to include the at least one object modified with the at least one display characteristic.

In one embodiment, detecting the focus position includes identifying at least one display region of a display device, and wherein the focus position is associated with a user gaze point for a period of time.

In one embodiment, identifying at least one object includes identifying at least one object within a predetermined distance from the focus position.

In one embodiment, identifying at least one object includes identifying at least one of a player controller object and player target.

In one embodiment, display characteristic is at least one of a highlight element, border, and change in presentation format for the at least one object.

In one embodiment, updating presentation of the gaming content includes alternating a display color of the at least one object.

In one embodiment, updating presentation of the gaming content includes at least one of filtering and minimizing display elements of the gaming content.

In one embodiment, updating presentation of the gaming content includes replacing the at least one object with a display element.

In one embodiment, the method further includes analyzing a facial expression of a user to detect at least one gesture.

In one embodiment, updating presentation of the gaming content is updated in response to detection of the at least one gesture.

Another embodiment is directed to a device configured for game object rendering control with eye tracking data. The device includes an interface configured to output gaming content, a memory storing executable instructions, and a controller coupled to the interface and the memory. The controller is configured to detect at least one focus position of a user using eye tracking data for the user, wherein the focus position is detected relative to a display location presenting gaming content. The controller is also configured to identify at least one object of the gaming content using the focus position, and control rendering of the at least one object of the gaming content, wherein at least one display characteristic of the at least one object is modified. The controller is also configured to update presentation of the gaming content to include the at least one object modified with the at least one display characteristic.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
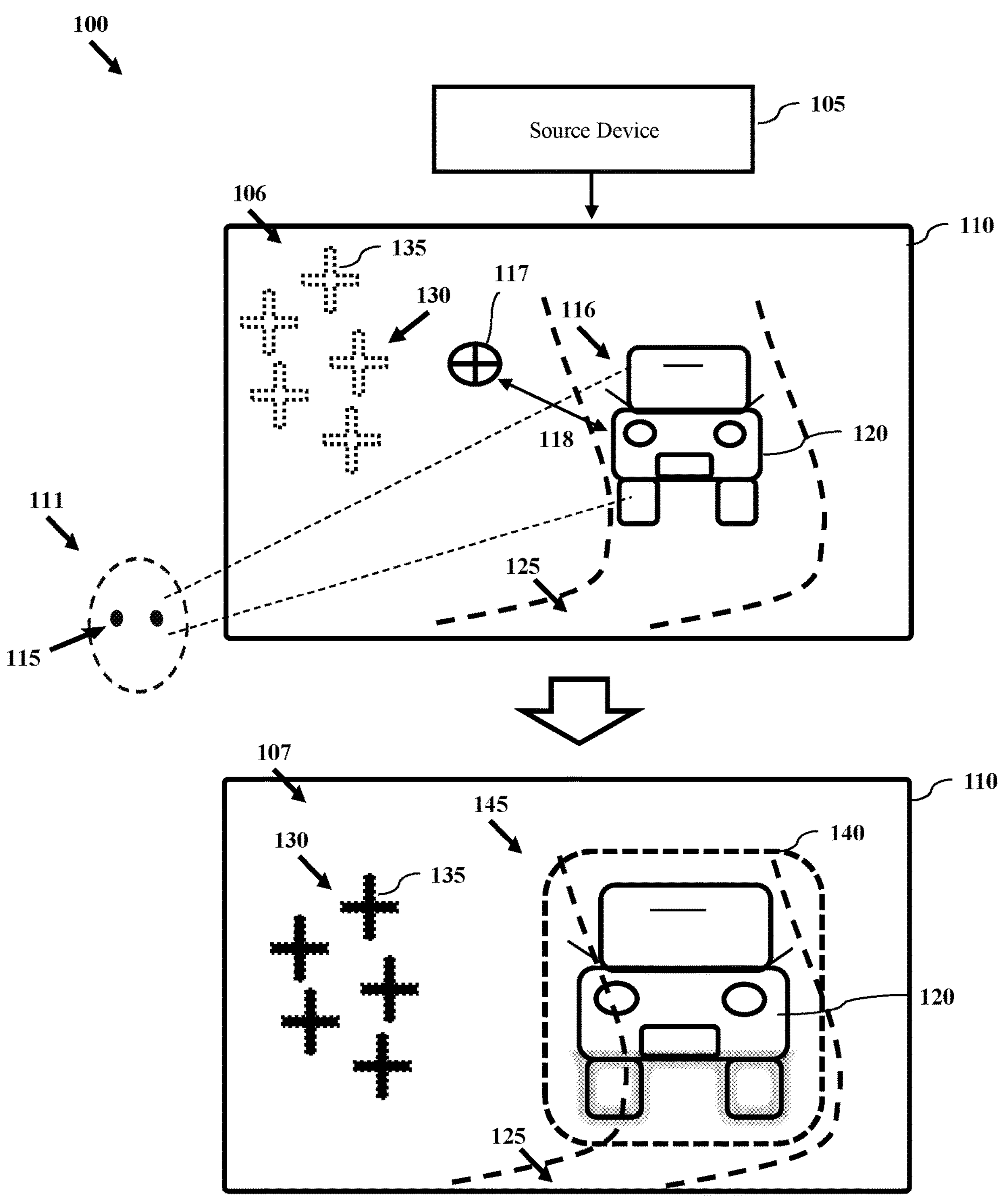
FIG. 1 illustrates a graphical representation of game object rendering control with eye tracking data according to one or more embodiments.

One aspect of the disclosure is directed to using eye tracking data for control and presentation of gaming content including altering rendering of game content. According to embodiments, presentation of gaming content can include altering content to provide one or more of an accessibility mode including a highlight feature and a minimalist rendering mode. Highlighting of a game element may include modifying one or more display characteristics of game objects for one or more of enhancing perception of a focused item, altering the appearance of an item, and controlling rendering of game content to reduce or improve display of game objects for a player. Embodiments include methods for game object rendering control and device configurations.

According to embodiments, eye tracking data may be used for one or more purposes including customization of gaming content and as a mechanism to allow for game functions to be provided to a user. Processes and device configurations are configured to provide accessibility modes to increase game object focus and presentation. Accessibility modes may include providing one or more highlight elements to game output. Highlight elements can include a boarder or shape enhancement around an item, blurring, fading and/or controlling color saturation for a game object. Highlight elements can include repositioning gaming objects relative to a display plane, increasing or decreasing object size and providing audio feedback for one or more game objects. According to embodiments, highlight elements may be provided as part of a game rendering and/or for rendered game output. In addition, accessibility modes may be triggered or controlled using one or more user expressions.

Another aspect of the disclosure is directed to controlling rendering modes of gaming content. Game content may present backgrounds or elements that make game play or perception of gaming objects difficult for a user. For example, a player with visual difficulties may have an impaired ability to discern important game objects in a display due to a background or other scene imagery. According to embodiments, an accessibility feature may be provided to allow for improved perceptibility, such as a minimalist rendering. When generating or outputting a minimalist game rendering, the background can be replaced with a very plain background, or one or more game elements may be altered to reduce the amount of visual distraction in the background, such as blurring the display of the background, reducing the color saturation of the background, or adjusting the brightness of the background. Minimalist rendering control is also provided to allow for activation and calibration of rendering styles to increase accessibility and provide improved game play experience.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

FIG. 1 illustrates a graphical representation of game object rendering control with eye tracking data according to one or more embodiments. System 100 includes source device 105 and display 110. According to embodiments, system 100 and source device 105 are configured to detect eye tracking data for control of gaming content output to display 110. According to embodiments, system 100 may optionally include a sensor (e.g., sensor 305), which may be a camera or other optical device, configured to detect and track user 111 and, in particular, eyes 115 of user 111. According to embodiments, the sensor may be independent from source device 105. According to other embodiments, a sensor may be integrated with source device 105 or display 110. In certain embodiments, display 110 may include one or more of hardware and software elements of source device 105. Source device 105 may be a game device, such as a gaming console or interactive entertainment device configured to output gaming content to display 110. Source device 105 may receive input from one or more game controllers.

According to embodiments, system 100, source device 105 and/or processes described herein may detect eye tracking data to control or modify output of gaming content. Eye tracking data may be detected, received and/or processed to identify one or more or a region of interest, object of interest, and user perception of gaming content. Accordingly, source device 105 and processes herein may detect objects associated with user gaze or focus, detect a focus position, or objects within a predetermined distance or range from the focus point. Similarly, source device 105 and processes herein may update the presentation format of gaming content, and/or features of game content. FIG. 1 illustrates user 111 viewing display 110 presenting content 106, which may be gaming content. Content 106 may include a plurality of objects, such as object 120 and group of objects 130. In some embodiments, object 120 is identified from a game model used to produce the rendering of content 106. In some embodiments, object 120 is identified by analyzing the rendering of content 106, such as through an image recognition algorithm or by using artificial intelligence. References and examples are provided herein describing source device 105 for presentation of game data. It should be appreciated that source device 105 may be a game device configured to present gaming content. It should also be appreciated that source device 105 may present video content and video programming, such as a movie or entertainment content, wherein objects of the video content and programming may be identified and modified.

Figure 2:
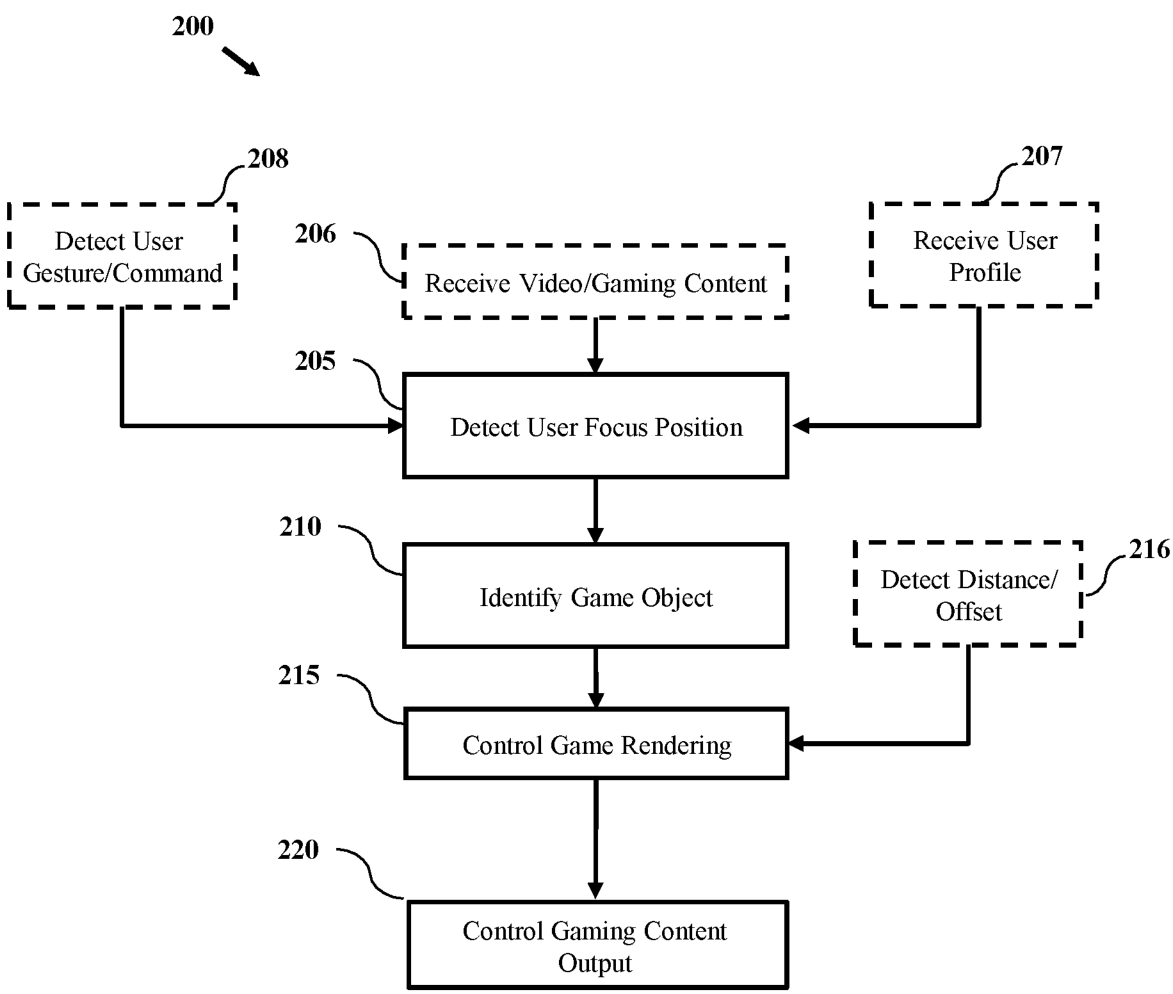
FIG. 2 illustrates a process for game object rendering control with eye tracking data according to one or more embodiments.

According to embodiments, source device 105 may be configured to perform a process, such as process 200 of FIG. 2, for one or more of controlling an accessibility mode, providing one or more highlight elements, and for output of a minimalist rendering mode. One or more modifications may be made to gaming content by using user eye tracking data. Source device 105 may receive eye tracking data to detect at least one focus point of a user. FIG. 1 illustrates focus point 116 as a portion of a screen associated with object 120. According to embodiments, focus point 116 may be detected as a focus position based on the user gaze, such as gaze point determined for a user based on eye tracking data. Focus point 116 may be determined based on current or real time eye tracking data, wherein the gaze point is associated with focus point for at least a period of time. A user may have multiple focus points determined during a time sample using eye tracking data. According to embodiments, game object rendering control may determine one or more objects associated with focus point 116, such as object 120 and object 125. In some cases, movement of focus point 116 may correspond to movement of object 120. Alternatively or in combination, focus point 117 may be detected as an area of a display screen that is not specifically associated with a displayed element (e.g., focus point 117 may be for illustration and not a displayed object). Identifying at least one object may then include identifying one or more objects with a predetermined distance, such as distance 118 from focus point 117. Embodiments allow for controlling presentation of objects, such as object 120 representing a vehicle and object 125 representing a path, travel or roadway for content 106. One or more characteristics of objects in content 106, which may be gaming data, may be modified using a focus position, such as focus point 116 or focus point 117. In additional, one or more elements may be added or presented to highlight objects of gaming data. In some cases, one or more characteristics of the content 106 other than object 120 can be modified, such as to grey out content surrounding object 120 to make object 120 stand out visually.

According to embodiments, identification of objects of content 106 may be determined using at least one focus position and a distance, such as distance 118, relative to the focus position. Distance 118 is shown as an example of identifying object 120 and/or object 125 relative to focus point 117. Distance 118 may represent a parameter to use for identification of objects, relative to a focus point, such as focus point 117, and to allow flexibility in determining portions of gaming content to modify.

According to embodiments, gaming content identified using a focus position may be for one or more elements of gaming data of content 106 including one or more of object 120, object 125 and object grouping 130 including object 135. Object 120 may be an example of a player controllable object wherein a position of object 120 may be controlled on display 110, and object 125 may be a pathway for objects to travel. Object grouping 130 may be game objects which can be used for interaction including one or more of collecting or avoid during a game. One or more of these objects, and objects in gaming content in general, may be identified and modified according to embodiments.

FIG. 1 illustrates an example of updating presentation of gaming content to include at least one object modified with at least one display characteristic. FIG. 1 illustrates modified content 107 which includes one or more objects from content 106 modified. Modified content 107 can include boarder 140 around object 120. Boarder 140 may be presented in a color or lighting scheme to allow a user to identify object 120. In situations where eye tracking data is determined to indicate a user not able to recognize object 120, boarder 140 may be presented as a highlight element. According to embodiments, object 120 may be modified to include an updated appearance including display characteristic 145 for one or more of a blurring, fading, lightening, darkening, and/or controlling the color saturation of an area of the object.

According to embodiments, updating presentation of an object may include increasing the size of the object. Object 120 is shown with an increased size as part of modified content 107. Object 120 may also represent one or more viewing planes (e.g., 3-dimensional viewing planes) to account for size change. One or more objects may also be presented with a display characteristic such as a color change, or lighted control. Object grouping 130 is modified to include a color change, such that the presentation format of object 135 is modified. In addition to visual modifications, one or more audio settings may be determined to provide audio feedback including but not limited to a name of an object, description, condition, game status (e.g., charge level, danger level, etc.) and game data in general.

According to embodiments, modifications from content 106, such as gaming data, to modified content 107, (e.g., modified gaming data) may be based on at least one focus position determined from eye tracking data. Eye tracking data may include at least one of a focus point, eye movement, eye movement speed, eye movement frequency, blink rate, pupil dilation and eye opening size. According to embodiments, eye tracking data may also provide information for one or more gestures or facial expressions. Accordingly, modified content 107, which can include gaming data, may be determined based on one or more facial expressions or user mannerisms. According to embodiments, source device 105 may be configured to provide interaction with modified content, such as object 120 and/or one or more objects that are modified or including a focus element. By way of example, source device 105 can provide actions include changing how object 120 is highlighted, and/or continuing to highlight object 120 after a user focus shifts away from object 120. If object 120 is a game object, source device 105 and/or one or more control features of a user interface of source device 105 can give the option to perform in-game actions with object 120. For example, if object 120 is a door, source device 105 can provide user interface features to allow opening or closing the door when object 120 is in focus. In another example, if object 120 is a ladder, source device 105 can provide user interface features to give the option to climb the ladder when object 120 is in focus. Source device 105 can provide user interface features to make interacting with in-game objects easier, especially for users with low vision or motor impairments. Interaction with object 120 and/or objects that are associated with a focus position may be done through gestures and/or through other inputs.

FIG. 2 illustrates process 200 for game object rendering control with eye tracking data according to one or more embodiments. Process 200 can provide eye tracking and interactive game control according to one or more embodiments. Process 200 may update game presentation using eye tracking data for a user, including modifying and/or controlling presentation of content, such as gaming content, gaming video and audio output. Process 200 may be performed by a device, such as device 300 and/or controller 310 of FIG. 3, for at least one of using eye tracking data, controlling output of gaming data and updating gaming content.

Process 200 may be initiated by a device (e.g., device 300) detecting a at least one user focus position at block 205. Process 200 can include detecting at least one focus position of a user at block 205 using eye tracking data for the user. At block 210, at least one object of the gaming content may be identified using the focus position, and rendering of the at least one object of the gaming content may be updated at block 215. Game rendering may be updated at block 215. At least one display characteristic of one or more objects of the gaming data may be modified or updated. At block 220, process 200 can include updating presentation of the gaming content to include the at least one object modified with the at least one display characteristic. Operations of process 200 are discussed in more detail below.

According to embodiments, process 200 includes determining at least one focus position detected relative to a display location presenting gaming content. Focus positions may be detected to identify elements of a game a user is looking at, such as an impending threat, an item to navigate around, a trophy, or game objects of interest. Focus positions may also be detected to identify areas of a display screen when a user has difficulty identifying game objects. For example, the user may be looking for an object on the wrong side or portion of a screen. When detecting a focus position, process 200 may identify multiple focus positions to account for different portions of a display screen a user views over a period of time. For the multiple focus positions, process 200 may identify one or more positions a user is viewing for more than a predetermined time.

Process 200 may detect a focus position to identify at least one display region of a display device, and the focus position may be associated with a user gaze point for a period of time. In certain embodiments a focus position may be identified based on a user viewing the position of a screen based on a game state. For example, game content and objects in a game often change based on user controls. For example, a side scrolling game may present different barriers or pathways based on the game state. Similarly, a first person game may present objects or allow access to items based on the position of a character in the game mapping. As such, process 200 may determine focus positions based on the portion of a display screen, which can include a location or position in a game mapping.

At block 210, process 200 can identify at least one object of the gaming content. Process 200 may identify objects based on the position of a focus position and may identify objects that are not close to the focus position. According to embodiments, process 200 may identify at least one object by identifying at least one of a player controlled object and player target. Using the location of a focus point, a controller (e.g., processor) of a source device may identify a player controlled object or player character to add a highlight to the character. Similarly, a target may be identified to add a highlight to the target. As discussed herein, highlight elements may be added and/or objects may be modified to provide accessibility. As such the game objects may be modified or highlighted to aid in operation of the game. Similarly, these features may be provided beyond increasing accessibility and may be included in game tutorials, game training, and providing hints.

According to embodiments, process 200 may identify at least one object within a predetermined distance from the focus position at optional block 216. Detection of a focus point away from a game object may indicate one or more conditions, including searching for an item, concern of a game threat, lack of focus, and inability to identify game objects. Accordingly, a focus position may not always line up with or be near game objects. Process 200 may employ the use of a predetermined distance, such as a percentage of the screen distance (e.g., 5%, 10%, 15%, 20%, etc.) from a focus point. Objects within or near the predetermined distance may be modified or updated in appearance. Alternatively, a source device may use the predetermined distance to modify only objects in the predetermined distance and leave other gaming content untouched or unmodified for a predetermined period of time or until the user controls the display. Detection of the predetermined distance at optional block 216 may be a distance or an offset in display position from one or more focus points.

At block 215, process 200 can control rendering of the at least one object of the gaming content. According to embodiments, controlling rendering at block 215 can be performed during rendering of video output for a game such that one or more rendering components of a device are controlled. Alternatively, or in combination, controlling rendering at block 215 can include controlling, changing, modifying and/or replacing already rendered game data. According to other embodiments, controlling rendering can include adding one or more elements to video data. Controlling game rendering at block 215 can include one or more of adding an accessibility element, adding a highlight element and providing a minimalist rendering.

According to embodiments, controlling game rendering at block 215 includes modifying at least one display characteristic of at least one game object. The display characteristic may include at least one of a highlight element, border, and change in presentation format for the at least one object. Highlight elements can be aligned to a focus point. One or more of a controller and a game physics engine can assign a shape of a game object, and modify appearance while rendering. According to embodiments, highlight elements including one or more characteristics may be added to gaming content at block 215. Process 200 can control rendering of the at least one object of the gaming content to include the one or more highlight characteristics which may be based on one or more accessibility modes. Rendering can be controlled to provide one or more accessibility modes to provide game object focus from eye tracking data.

According to embodiments, highlighting or adding a highlight element can include adding at least one display feature for one or more objects that a player is currently looking at, such as one or more objects associated with a focus position. As used herein, highlighting can take a variety of forms, many of which can enhance player perception of a focused item. For example, placing a boarder around the item can make the shape of the item easier for the player to discern. According to embodiments, possible methods of highlighting an object can include:

- placing a boarder around the item;
- blurring, fading, lightening, darkening, or reducing the color saturation of the area around the object;
- moving an object that is focused on closer in a 3D display, such as a head mounted display (HMD) or 3D TV display;
- increasing the size of the object that is focused on. This can allow the user to see finer details of the object in addition to separating the object from the background;
- providing audio feedback about the object such as a name for the object or other information, such as a description, condition, or charge level; and/or
- triggering the highlighting of a game object may be done by gestures, such as blinking, winking the left eye, winking the right eye, head nodding, squinting, eyebrow raising, widely opening the eyes, or hand movements.

According to embodiments, colors used for highlighting game objects can be tailored to the player. Some colors may stand out better for some players compared to other players. For example, a red highlight of a green plant may stand out very well for most users, but for a player with red-green color blindness, such a highlight may be hard to see. A player profile may include information about color perception and preferences for the player, which can be used to choose colors and color combinations that are easy for the player to discern.

According to embodiments, in some situations, controlling game rendering at block 215 can include rendering objects with alternate colorations. For example, characters on the players team can be rendered with shades of green, enemy characters can be rendered with shades of red, objects the character can interact with can be rendered with shades of yellow, and obstacles can be rendered with shades of blue. Using color can help a player quickly discern important game elements, especially for a player who has a visual impairment. Different colorations may work best for different players. For a player with red-green color blindness, using red for one set of objects and green for another set of objects should be avoided. According to embodiments, colorations to use can be customizable in a player profile to allow a player to pick colors that are easily visible and meaningful to them. A player can be allowed to customize colorations on a game object basis, which would allow a player to put more coloration emphasis on objects they commonly have difficulty noticing in the game.

According to embodiments, a gaming device can perform one or more tests or calibrations to determine color settings for a player. Alternatively, artificial intelligence and/or models of processing input can analyze player game play to determine the colors or other characteristics of the display where the player seems to have difficulty noticing. Color settings that are calibrated for the player may also calibrated for the display device the player is using to play the game. For example, if a player is playing on an old TV with color settings that are badly out of calibration the tests or calibration to determine the color settings for the player will determine which colors work best for the player to discern when viewed through that display.

According to embodiments, controlling game rendering at block 215 includes providing one or more minimalist rendering modes. Process 200 can allow for control for games that include a busy background. While background may add a degree of depth and immersion in the game, a player with visual difficulties may not be able to discern important game objects in the display as it is hard to tell objects apart from background. According to embodiments and as an accessibility option, a game can provide a minimalist rendering option. When creating a minimalist game rendering, one or more portions of a background, or the background entirely, can be replaced with a very plain background or can be altered to reduce the amount of visual distraction in the background, such as blurring the display of the background, reducing the color saturation of the background, or adjusting the brightness of the background.

According to embodiments, process 200 at block 215 may be configured to create a minimalist rendering of a game to filter out or mute objects that the player cannot interact with. The game rendering may be controlled to focus on characters in the game and interactions with other characters and objects within the game world. As such, visual clutter may be reduced and players may be aided in focusing on the game elements that are important to game play. Minimalist renderings may attenuate signals outside the frustum of gaze.

According to embodiments, minimalist rendering may include controlling gaming content beyond merely filtering content. For example, at block 215 objects may be bumped up or down in order with respect to a display layer position. With respect to audio elements, audio of objects associated with a focus position may be increased to provide the ability of a user to focus in on sound source information. Modifications to gaming content may be for a period of time, for clips of time, in bursts and/or based on user expressions and/or commands.

According to embodiments, eye tracking and one or more learning models may be used by a gaming device (e.g., artificial intelligence) to determine if a player is having difficulty discerning particular objects from background. Gaming device code may execute models trained by analyzing gameplay and eye tracking data from many players. If difficulty discerning a particular object is detected, the rendering of that object can be adjusted to see if alternate renderings can improve player ability to discern the object. In such a manner the gaming device models can be tailored to a particular player. Gaming content may have alternative graphics, such as a stylized look instead of a photo-realistic look, that can be used for an object to have options that may be better discerned by a particular player. The system can tell when rendering adjustments are a good fit for a player if the player's ability to make progress in the game improves.

At block 220, controlling output of gaming content includes the at least one object modified with the at least one display characteristic can include one or more of updating presentation of the gaming content to include alternating a display color of the at least one object, updating presentation of the gaming content to include at least one of filtering and minimizing display elements of the gaming content, and updating presentation of the gaming content to include replacing the at least one object with a display element. According to embodiments, updating presentation of gaming content may be more than applying a color filter to all gaming content. Process 200 may direct a game engine to modify parameters for rendering of content. By modifying rendering, one or more highlights may be added to gaming content displayed. In addition, processing may be improved by limiting or filtering content to be rendered by a game engine. In addition, process 200 may modify a game vector for control of rendering. Similarly, one or more of a math engine, rendering engine and physics engine of a game may be controlled to include highlight elements and/or minimalist rendering. For example, during every game-tick, one or more features of a character flow and object representation may be controlled. At block 220, updating presentation of the gaming content may include alternate graphics for elements and/or device generated graphics to replace gaming objects.

Process 200 may optionally receive gaming content at optional block 206. Process 200 may be performed by a gaming device executing code of a game and/or receiving game data, such as a network game. Receiving video/gaming content at optional block 206 can include video data and one or more game parameters.

Process 200 may optionally detect user gestures and/or commands at optional block 208. According to embodiments, different gestures may trigger different highlighting. For example, a user winking their right eye may trigger the controller to play audio with the name of the focused object, while winking the left eye may trigger the controller to play audio giving more detailed information about the focused object. At block 208, process 200 can including analyzing facial expressions of a user to detect at least one gesture. Based on a detected facial expression (e.g., a first command) and/or at least one gesture, process 200 can include updating presentation of the gaming content. Updating presentation of a highlight element may be a for a period of time. Detection of another gesture or a repeat of a gesture, such as a second wink (e.g., second command), may end presentation of the highlight element. Alternatively, detection of a facial expression associated with a state or look of confusion, may be a basis for triggering a modification to gaming content. In some embodiments, detection of gestures may be made using information from eye tracking hardware. In some embodiments, detection of gestures may be made using information from sensors to detect body movements, such as one or more of a hand movement, a foot movement, or a head nod.

At optional block 207, process 200 can receive user profile data. User profile data may provide an identification or list of items a user prefers for rendering. User profile data may also account for regional and cultural parameters. User profile data may be gathered by a gaming device for a user based on game play sessions. User profile data may be used by process 200 to tailor presentation of gaming content including one or more of modification of colors for objects to stand out, adjustment based on particular player perception, and allow for accessibility features to be provided. According to embodiments, user profile data may be generated based on a test provided for users. Different users may respond better to different cues. A game or game system can provide a calibration mechanism to determine which renderings are easier or more difficult for a player to discern. Information from such a calibration can be stored in the player's profile.

Process 200 and device configurations discussed herein can account for players that have difficulty discerning depth in a three-dimensional display and for games on a display that only displays in two dimensions. Highlighting the depth of game elements can provide useful information to a player is such a situation. Process 200 can provide one or more configurations for indicating object depth. For example, indicators may be added to objects, such as outlines around objects with different colorations or shadings to indicate the depth of the objects. Alternatively, the indicator can be in the form of a dial icon which points in different directions to indicate different depths. A characteristic of the display of an object that is focused on may be modified, such as to zoom in for close objects and zoom out for far objects. Alternatively, if the output is to a 3D display, the depth at which the object is displayed can be exaggerated relative to nearby objects to make the difference more discernable. When adding indicators to objects, the objects the indicators are added to can include: the object the player is focused on, as determined using eye tracking, all non-background objects and the object the player is focused on and objects that are overlapping with that object or within a certain distance of that object.

Figure 3:
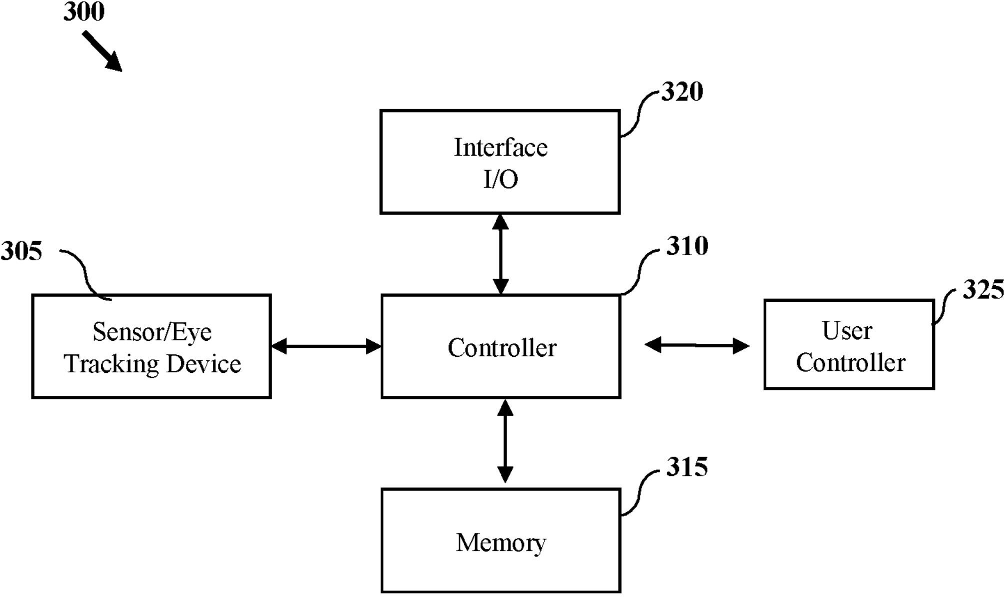
FIG. 3 illustrates a graphical representation of a device configuration according to one or more embodiments.

FIG. 3 illustrates a graphical representation of a device configuration according to one or more embodiments. Device 300 is configured to game object rendering with eye tracking data, and interactive game control. Device 300 may relate to a gaming console, media device, and/or handheld device. Device 300 may be configured to present and update gaming content using one or more player engagement parameters. According to embodiments, device 300 includes sensor/eye tracking device 305, controller 310, and memory 315. Device 300 may also include an interface (e.g., network communication module, input/output (I/O) interface) 320. Device 300 may receive input from a game controller 325. Device 300 may output gaming content to a display using interface 320.

Controller 310 may relate to a processor or control device configured to execute one or more operations (e.g., executable instructions) stored in memory 315, such as processes for updating gaming content to provide accessibility and altered game rendering. Memory 315 may be non-transitory memory configured to provide data storage and working memory operations for device 300. Memory 315 may be configured to store computer readable instructions for execution by controller 310 for one or more processes described herein. Interface 320 may be a communications module configured to receive and transmit network communication data.

Device 300 may be configured to receive gaming media (e.g., card, cartridge, disk, etc.) and output visual and audio content of the gaming media to a display. For network games, device 300 may receive game data from a network source. Device 300 may be configured to receive input from one or more peripheral devices, such as sensor 305 and user controller 325.

Controller 300 may be configured to control presentation of gaming content, and detect eye tracking data for at least one user. Controller 300 may also be configured to determine one or more focus positions associated with a display and gaming content based on the eye tracking data, and update presentation of the gaming content. Controller 300 may be configured to control and/or direct a game engine for game mechanics based on a focus position. Similarly, controller 300 can control and/or direct a rendering engine for object presentation.

Figure 4A:
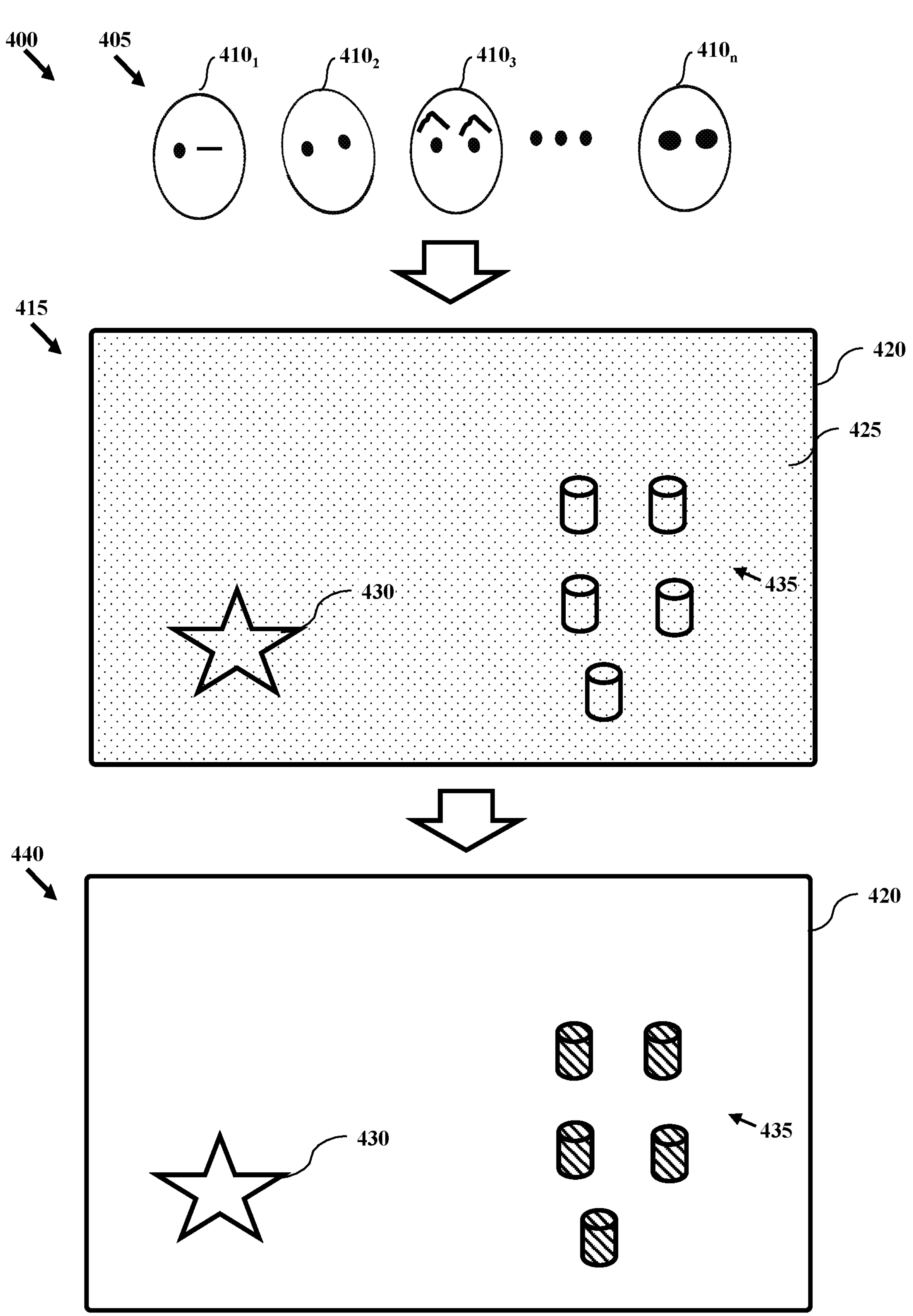
FIGS. 4A-4B illustrate graphical representations of game object rendering control according to one or more embodiments.
Figure 4B:
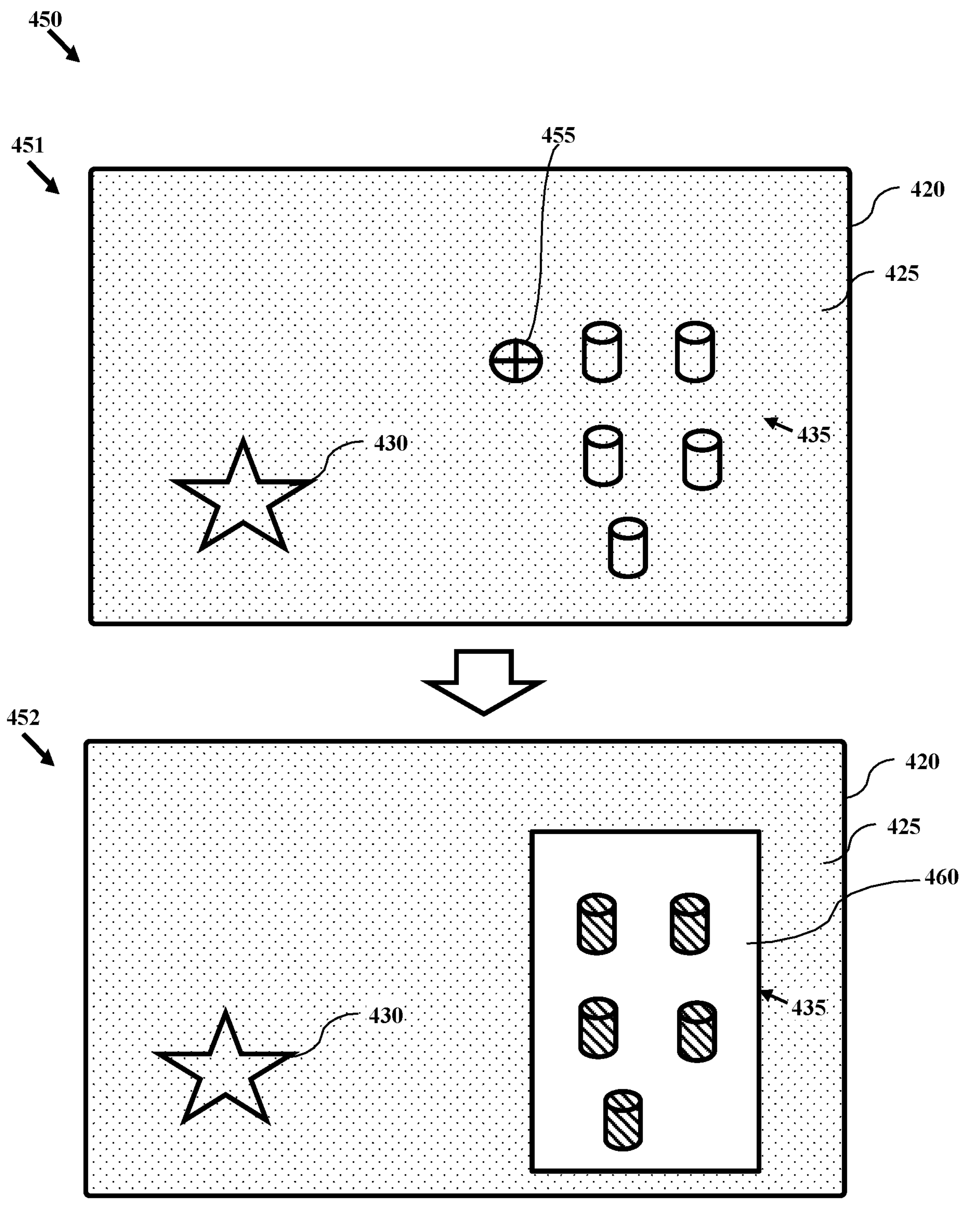

FIGS. 4A-4B illustrate graphical representations of game object rendering control according to one or more embodiments. According to embodiments, gaming content presentation may be updated one or more ways. In addition, eye tracking data may be used to identify one or more user gestures and/or expressions, such as facial expressions and player gestures which may be detected and used for control of output of gaming content. A controller (e.g., controller 305) of a source device may be configured to receive eye tracking data for determining one or more control parameters. The control parameters may be determined by analyzing one or more user expressions, such as a facial expression. Based on the control parameters, the game controller may adjust or modify game output. FIG. 4A illustrates process 400 which may be configured to detect at least one user gesture, which may be facial expression, facial movement, eye expression, and gesture in general. The game controller may be configured to capture user gestures and record features to allow for the gesture to be used in control of game play. Process 400 can include detection of one or more gestures 405 from eye tracking data. Gestures 405 are exemplary, and it should be appreciated that other types of gestures, facial moves and user actions may similarly be applied. According to embodiments, gestures can include a wink 4101, head tilt 4102, eyebrow raise 4103 and wide eyed facial expression $410_n$. According to embodiments, one or more of gestures 405 may be detected during presentation of gaming content.

Process 400 may include presentation of gaming content 415 on a display 420 including background 425 and one or more objects, such as object 430 and group of objects 435. According to embodiments, gaming content 415 may be a presentation of gaming content for a regular or unmodified gaming more. Object 430 may be a player controlled element, group of objects 435 may be one or more elements for a user to interact with, including interaction of object 430 with objects 435. Alternatively, a user may control group of objects 435 for interaction with object 430. According to embodiments, process 400 can include updating presentation of gaming content from gaming content 415 to a modified version. FIG. 4A illustrates conversion of gaming content 415 to gaming content 440 on display 420. According to embodiments, gaming content 440 may relate to one or more of a modified, accessible and minimalist presentation of gaming content 415. By way of example, gaming content 440 may be presented without background 425, such that process 400 may remove one or more background elements. Removal of background elements, such as background 425 may allow for a user to more easily focus and/or perceive one or more of gaming objects, such as gaming object 430 and group of objects 435. According to another embodiments, process 400 may modify the presentation of objects. FIG. 4A illustrates group of objects 435 with a modified presentation, such that the displayed appearance includes one or more of a pattern, coloration and display change. Process 400 may also be configured to include one or more highlight elements.

According to embodiments, process 400 may provide a minimalist rendering by removing one or more features of gaming content 415. According to embodiments, one or more of gestures 405 may be detected during presentation of gaming content. Process 450 may be configured to update presentation of gaming content 451 in response to one or more detected gestures, such as gestures 405. Detection of gestures 405 may be used to activate, deactivate and toggle between one or more modified representations.

FIG. 4B illustrates process 450 which update presentation of gaming content according to embodiments. Process 450 may include presentation of gaming content 451 on display 420 including background 425 and one or more objects, such as object 430 and group of objects 435. Process 450 may include updating presentation of gaming content 451 to gaming content 452. According to embodiments, updating of presentation content may be based on detection of at least one focus position, shown as focus position 455. Focus position 455 may be an area of interest on display 425 detected using eye tracking. According to embodiments, based on detection of focus position 455, process 450 may include updating the presentation of gaming content 451 to gaming content 452. Gaming content 452 includes object 430, background 425 and group of objects 435. According to embodiments, gaming content 451 is modified, such that gaming content 452 includes area 460 presented with at least one modification. For example, compared to gaming content 451, area 460 gaming content 452 includes a portion, area or section of display 420 with background 425 removed and modifications to the presentation of group of objects 435. Area 460 may provide a highlight feature to allow for group of objects 435 to be more perceptible. In addition, area 460 may allow for at least a portion of the display area to be provided with a minimalist rendering.

According to embodiments, area 460 allows for a highlight and/or modification of at least an area of gaming content. As such the processing burden for providing an accessible or minimal rendered area may be reduced. Similarly, processing time to allow for presentation of content without disrupting the game stream can be provided by limiting the area for modification. By modifying an area of a display screen the user may be provided with a representation of gaming content to allow for gaming based on the user needs. In addition, Process 450 may be configured to update presentation of gaming content 451 in response to one or more detected gestures, such as gestures 405. Detection of gestures 405 may be used to activate, deactivate and toggle between one or more modified representations.

While this disclosure has been particularly shown and described with references to exemplary embodiments thereof, it will be understood by those skilled in the art that various changes in form and details may be made therein without departing from the scope of the claimed embodiments.

What is claimed is:

1. A method comprising:

detecting, by a device, a plurality of focus positions corresponding to a gaze of a user looking at one or more points along a displayed virtual environment based at least in part on eye tracking data of the user, wherein a first focus position of the plurality of focus positions corresponds to a first point of the one or more points that is distanced from a first virtual object in the displayed virtual environment;

determining, by the device, that the first virtual object in the displayed virtual environment is within a predetermined distance from the first focus position;

modifying, by the device, at least one display characteristic of the first virtual object to generate at least one modified virtual object; and updating, by the device, presentation of the displayed virtual environment to include the at least one modified virtual object.

2. The method of claim 1, wherein the first focus position is associated with the gaze looking at the first point for a period of time.

3. The method of claim 1, wherein the first virtual object includes at least one of a player controller object or player target.

4. The method of claim 1, wherein the at least one display characteristic is at least one of a highlight element, border, or change in presentation format for the first virtual object.

5. The method of claim 1, wherein updating presentation of the displayed virtual environment includes at least one of alternating a display color of the first virtual object, filtering or minimizing display elements of the displayed virtual environment, minimizing display elements of the displayed virtual environment, or replacing the first virtual object with a display element.

6. The method of claim 1, further comprising analyzing a facial expression of the user to detect at least one gesture, wherein updating presentation of the displayed virtual environment is updated in response to detection of the at least one gesture.

7. The method of claim 1, wherein:

the displayed virtual environment is being displayed on a screen; and the predetermined distance is a predetermined percentage of screen distance of an area of the screen from the first focus position to the first virtual object.

8. The method of claim 1, further comprising:

identifying a second virtual object in the displayed virtual environment outside of the predetermined distance from the first focus position; and modifying at least one second display characteristic of the second virtual object, wherein updating presentation of the displayed virtual environment includes updating presentation of the displayed virtual environment to include the second virtual object.

9. The method of claim 1, further comprising, after modifying the first virtual object to generate the at least one modified virtual object:

detecting, by the device based at least in part on the eye tracking data, a second focus position corresponding to the gaze of the user looking at a second point along the displayed virtual environment, wherein the second focus position is on the at least one modified virtual object; and modifying, by the device, at least one second display characteristic different than the at least one display characteristic of the at least one modified virtual object to generate at least one second modified virtual object.

10. The method of claim 1, wherein:

a second focus position of the plurality of focus positions is distanced from a second virtual object in the displayed virtual environment;

determining that the first virtual object is within the predetermined distance of the first focus position includes determining that the second virtual object is within the predetermined distance of the second focus position;

modifying the at least one display characteristic of the first virtual object includes modifying at least one display characteristic of the second virtual object to generate at least one second virtual modified object; and updating the presentation of the displayed virtual environment includes the at least one second virtual modified object.

11. A device comprising:

a memory storing computer-executable instructions; and a controller coupled to access the memory and execute the computer-executable instructions to perform operations comprising:

detecting a plurality of focus positions corresponding to a gaze of a user looking at one or more points along a displayed virtual environment based at least in part on eye tracking data of the user, wherein a first focus position of the plurality of focus positions corresponds to a first point of the one or more points that is distanced from a first virtual object in the displayed virtual environment;

determining that the first virtual object in the displayed virtual environment is within a predetermined distance from the first focus position;

modifying at least one display characteristic of the first virtual object to generate at least one modified virtual object; and updating presentation of the displayed virtual environment to include the at least one modified virtual object.

12. The device of claim 11, wherein the first focus position is associated with the gaze looking at the first point for a period of time.

13. The device of claim 11, wherein the first virtual object includes at least one of a player controller object or player target.

14. The device of claim 11, wherein the at least one display characteristic is at least one of a highlight element, border, or change in presentation format for the first virtual object.

15. The device of claim 11, wherein updating presentation of the displayed virtual environment includes at least one of alternating a display color of the first virtual object, filtering display elements in the displayed virtual environment, minimizing display elements of the displayed virtual environment, or replacing the first virtual object with a display element.

16. The device of claim 11, further comprising analyze facial expression of the user to detect at least one gesture, wherein updating presentation of the displayed virtual environment is updated in response to detection of the at least one gesture.

17. One or more non-transitory computer-readable media comprising computer-executable instructions that, when executed by one or more processors of an electronic device, cause the electronic device to perform operations comprising:

detecting a plurality of focus positions corresponding to a gaze of a user looking at one or more points along a displayed virtual environment based at least in part on eye tracking data of the user, wherein a first focus position of the plurality of focus positions corresponds to a first point of the one or more points that is distanced from a first virtual object in the displayed virtual environment;

determining that the first virtual object in the displayed virtual environment is within a predetermined distance from the first focus position;

modifying at least one display characteristic of the first virtual object to generate at least one modified virtual object; and updating presentation of the displayed virtual environment to include the at least one modified virtual object.

18. The one or more non-transitory computer-readable media of claim 17, wherein the first focus position is associated with the gaze looking at the first point for a period of time.

19. The one or more non-transitory computer-readable media of claim 17, wherein the at least one display characteristic is at least one of a highlight element, border, or change in presentation format for the first virtual object.

* * * * *